United States Patent
Yu et al.

(10) Patent No.: US 11,855,460 B2
(45) Date of Patent: Dec. 26, 2023

(54) PHOTOVOLTAIC INVERTER AND CORRESPONDING SWITCHING FREQUENCY CONTROL METHOD

(71) Applicant: Huawei Digital Power Technologies Co., Ltd., Shenzhen (CN)

(72) Inventors: Xinyu Yu, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 279 days.

(21) Appl. No.: 17/503,016

(22) Filed: Oct. 15, 2021

(65) Prior Publication Data

US 2022/0037890 A1 Feb. 3, 2022

Related U.S. Application Data

(63) Continuation of application No. PCT/CN2019/126854, filed on Dec. 20, 2019.

(30) Foreign Application Priority Data

Apr. 17, 2019 (CN) .......................... 201910316131.3

(51) Int. Cl.
*H02M 7/539* (2006.01)
*H02J 3/46* (2006.01)
(Continued)

(52) U.S. Cl.
CPC ................ *H02J 3/46* (2013.01); *H02J 3/381* (2013.01); *H02M 1/0054* (2021.05);
(Continued)

(58) Field of Classification Search
CPC .. H02M 1/0054; H02M 7/539; H02J 2300/26; H02J 3/46; H02J 3/381; H02S 40/32
See application file for complete search history.

(56) References Cited

U.S. PATENT DOCUMENTS

2009/0272735 A1* 11/2009 Suenaga ................ H05B 6/685
219/702
2009/0279336 A1 11/2009 Erdman et al.
(Continued)

FOREIGN PATENT DOCUMENTS

CN 1399388 A 2/2003
CN 102751742 A 10/2012
(Continued)

OTHER PUBLICATIONS

Wang et al., "Delay-Dependent Stability of Single-Loop Controlled Grid-Connected Inverters with LCL Filters," IEEE Transactions on Power Electronics, vol. 31, No. 01, pp. 743-757, Institute of Electrical and Electronics Engineers, New York, New York (Jan. 2016).
(Continued)

*Primary Examiner* — Harry R Behm
(74) *Attorney, Agent, or Firm* — Leydig, Voit & Mayer, Ltd.

(57) ABSTRACT

A photovoltaic inverter is provided, including an inverter circuit, a data sampling module, and a control module. The inverter circuit includes a switch component and an alternating current output terminal. The data sampling module is configured to collect, from the alternating current output terminal, an instantaneous current value at each sampling point moment in target sampling duration and an instantaneous value of each-phase current at a target moment. The control module is configured to: determine a valid current value of the target sampling duration based on the instantaneous current value at each sampling point moment, determine an upper switching frequency limit and a lower switching frequency limit of an $N^{th}$ switching period based on the valid current value, and determine a target instanta-
(Continued)

neous current value $I_N$ based on the instantaneous value of each-phase current at the target moment.

20 Claims, 8 Drawing Sheets

(51) Int. Cl.
 *H02S 40/32* (2014.01)
 *H02J 3/38* (2006.01)
 *H02M 1/00* (2006.01)
(52) U.S. Cl.
 CPC ............. *H02M 7/539* (2013.01); *H02S 40/32* (2014.12); *H02J 2300/26* (2020.01)

(56) References Cited

U.S. PATENT DOCUMENTS

| | | |
|---|---|---|
| 2010/0141190 A1 | 6/2010 | Fraeger |
| 2012/0217795 A1 | 8/2012 | Hasegawa et al. |

FOREIGN PATENT DOCUMENTS

| | | | |
|---|---|---|---|
| CN | 102832644 A | | 12/2012 |
| CN | 102931682 A | | 2/2013 |
| CN | 103532170 A | | 1/2014 |
| CN | 104242617 A | | 12/2014 |
| CN | 104615190 A | * | 5/2015 |
| CN | 106385196 A | | 2/2017 |
| CN | 106505621 A | | 3/2017 |
| CN | 107887927 A | | 4/2018 |
| CN | 110098635 A | | 8/2019 |

OTHER PUBLICATIONS

Xie Ping et al., "Control Strategy of Grid-Connected Photovoltaic Inverter," Low Voltage Apparatus, No. 14, total 4 pages (2010). With English abstract.

Huang Caineng et al., "Efficient controller design for grid tied photovoltaic inverter," Information and Communications, Sum. No. 114, total 2 pages (2011). With English abstract.

* cited by examiner

PHOTOVOLTAIC INVERTER AND CORRESPONDING SWITCHING FREQUENCY CONTROL METHOD

CROSS-REFERENCE TO RELATED APPLICATIONS

This application is a continuation of International Application No. PCT/CN2019/126854, filed on Dec. 20, 2019, which claims priority to Chinese Patent Application No. 201910316131.3, filed on Apr. 17, 2019. The disclosures of the aforementioned applications are hereby incorporated by reference in their entireties.

TECHNICAL FIELD

Embodiments of this application relate to the field of photovoltaic technologies, and in particular, to a photovoltaic inverter and a corresponding switching frequency control method.

BACKGROUND

As a type of renewable and clean energy, the photovoltaic power generation industry has developed rapidly in recent years. A photovoltaic power generation system includes a plurality of components, such as a photovoltaic module, a photovoltaic inverter, a transformer, and a cable. The photovoltaic inverter is a core component for energy conversion of the photovoltaic power generation system, and plays a role of converting a direct current output by the photovoltaic module into an alternating current available in a power grid. Conversion efficiency of the photovoltaic inverter refers to a percentage of output power of the photovoltaic inverter to input power of the photovoltaic inverter. On the premise of inputting same power, higher conversion efficiency of the photovoltaic inverter leads to higher output power, and brings greater power generation benefits.

The photovoltaic inverter has a loss when working, and the loss affects the conversion efficiency of the photovoltaic inverter. Under the same input power, a greater loss leads to lower conversion efficiency of the photovoltaic inverter. Losses of the photovoltaic inverter include a conduction loss of a switch component, a switching loss of the switch component, a ferromagnetic loss of a filter, a through-current loss of the filter, and the like. The switching loss of the switch component is an important factor affecting grid-connected efficiency of the photovoltaic inverter, and the switching loss is directly related to a switching frequency of the photovoltaic inverter. Under a same working condition, a higher switching frequency leads to a greater switching loss of the photovoltaic inverter.

During grid-connected operation of the photovoltaic inverter, that is, in a process in which a direct current of the photovoltaic module is converted into an alternating current and the alternating current is sent to a mains network, stability of grid-connected control of the photovoltaic inverter needs to be ensured, in addition to converting the input power to the output power as efficiently as possible. Currently, most photovoltaic inverters use an LCL filter as a grid-connected filter, and the LCL filter has a resonance spike. If the switching frequency of the photovoltaic inverter is improperly matched with an LCL parameter, an output current and a voltage of a grid-connected port may oscillate, causing the inverter to shut down due to overcurrent or overvoltage. In severe cases, the inverter may even be damaged.

It can be learned from the foregoing analysis that the switching frequency of the photovoltaic inverter affects not only the conversion efficiency of the photovoltaic inverter but also grid-connected performance of the photovoltaic inverter. Therefore, the switching frequency of the photovoltaic inverter is an important parameter during the grid-connected operation of the photovoltaic inverter, and needs to be properly controlled.

SUMMARY

Embodiments of this application provide a photovoltaic inverter and a corresponding switching frequency control method, to improve conversion efficiency of the photovoltaic inverter on the premise of ensuring grid-connected stability.

A first aspect of this application provides a photovoltaic inverter, including:

an inverter circuit, a data sampling module, and a control module. The inverter circuit includes a switch component, and the switch component is configured to control on/off of the inverter circuit. A direct current side of the inverter circuit includes an input bus positive electrode and an input bus negative electrode, and the input bus positive electrode and the input bus negative electrode are configured to receive a direct current. An alternating current side of the inverter circuit includes an alternating current output terminal, and the alternating current output terminal is configured to output an alternating current.

The data sampling module is configured to collect, from the alternating current output terminal, an instantaneous current value at each sampling point moment in target sampling duration and an instantaneous value of each-phase current at a target moment, where the target sampling duration is sampling duration that uses the target moment as an end moment.

The control module is configured to:

determine a valid current value of the target sampling duration based on the instantaneous current value at each sampling point moment, determine an upper switching frequency limit and a lower switching frequency limit of an $N^{th}$ switching period based on the valid current value, and determine a target instantaneous current value $I_N$ based on the instantaneous value of each-phase current at the target moment; and determine a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period, where $F_{ND} \leq f_N \leq F_{NU}$, the target switching frequency is used to control the switch component, and N is an integer greater than 1.

If $I_N > I_{N-1}$, and $F_{ND} \leq f_{N-1} \leq F_{NU}$, $f_N > f_{N-1}$; or if $I_N < I_{N-1}$, and $F_{ND} \leq f_{N-1} \leq F_{NU}$, $f_N$ is less than $f_{N-1}$, where $f_{N-1}$ is a target switching frequency of an $(N-1)^{th}$ switching period, and $I_{N-1}$ is a target instantaneous current value of the $(N-1)^{th}$ switching period.

It can be learned from the first aspect that the photovoltaic inverter may determine the upper switching frequency limit and the lower switching frequency limit by using the valid current value, and determine the target switching frequency between the upper switching frequency limit and the lower switching frequency limit based on a comparison of the target instantaneous current value with an instantaneous current value of a previous switching period, to ensure that the target switching frequency is greater than a switching frequency of the previous switching period when a target instantaneous current is greater than an instantaneous current of the previous switching period, and ensure that the target switching frequency is less than the switching frequency of the previous switching period when the target instantaneous current is less than the instantaneous current of the previous switching period. In this way, the target switching frequency determined by using the instantaneous current can be more adapted to a parameter of a filter in the inverter circuit, thereby ensuring grid-connected stability. In addition, the target switching frequency is related to the upper switching frequency limit and the lower switching frequency limit that are determined by using the valid current value, so that conversion efficiency of the photovoltaic inverter can be further improved on the whole.

With reference to the first aspect, in a first possible implementation, the control module includes a calculation unit.

The calculation unit is configured to determine the valid current value of the target sampling duration based on the instantaneous current value at each sampling point moment in the target sampling duration, determine a maximum value of an absolute instantaneous current value based on the instantaneous value of each-phase current at the target moment, and determine the maximum value of the absolute instantaneous current value as the target instantaneous current value $I_N$ of the $N^{th}$ switching period.

With reference to the first possible implementation of the first aspect, in a second possible implementation, the control module further includes a frequency control unit, and the frequency control unit is configured to:

determine, based on the valid current value of the target sampling duration, a first mapping relationship, and a second mapping relationship, an upper switching frequency limit $F_{NU}$ and a lower switching frequency limit $F_{ND}$ that correspond to the valid current value of the target sampling duration, where the first mapping relationship is a mapping relationship between an upper switching frequency limit and a valid current value, the second mapping relationship is a mapping relationship between a lower switching frequency limit and a valid current value, the upper switching frequency limit in the first mapping relationship first decreases and then increases as the valid current value increases, and the lower switching frequency limit in the second mapping relationship first decreases and then increases as the valid current value increases; and determine $f_N$ based on $F_{NU}$, $F_{ND}$, and the maximum value of the absolute instantaneous current value.

It can be learned from the second possible implementation of the first aspect that change trends of the first mapping relationship and the second mapping relationship are both first decreasing and then increasing as the valid current value increases. In this way, on the premise of ensuring grid-connected stability, a part that is first reduced with the increase of the current can effectively reduce a loss of the switch component, thereby improving overall conversion efficiency of the photovoltaic inverter.

With reference to the first or the second possible implementation of the first aspect, in a third possible implementation, the control module further includes a drive unit.

The drive unit is configured to generate a control signal of the switch component based on the target switching frequency, where the control signal is used to control on/off of the switch component.

With reference to the second possible implementation of the first aspect, in a fourth possible implementation, the frequency control unit is configured to determine $F_{NU}$ as $f_N$ of the $N^{th}$ switching period when an absolute deviation value between the maximum value of the absolute instantaneous current value and times the valid current value is less than a first preset value.

With reference to the second possible implementation of the first aspect, in a fifth possible implementation, the frequency control unit is configured to determine $F_{ND}$ as $f_N$ of the $N^{th}$ switching period when the output terminal outputs a three-phase alternating current, and when an absolute deviation value between the maximum value of the absolute instantaneous current value and $\sqrt{6}/2$ times the valid current value is less than a second preset value.

With reference to the second possible implementation of the first aspect, in a sixth possible implementation, the frequency control unit is configured to determine $F_{ND}$ as $f_N$ of the $N^{th}$ switching period when the output terminal outputs a single-phase alternating current, and when an absolute deviation value between the maximum value of the absolute instantaneous current value and zero is less than a third preset value.

A second aspect of this application provides a switching frequency control method. The method is applied to a photovoltaic inverter, and the photovoltaic inverter includes an inverter circuit. The inverter circuit includes a switch component, and the switch component is configured to control on/off of the inverter circuit. A direct current side of the inverter circuit includes an input bus positive electrode and an input bus negative electrode, and the input bus positive electrode and the input bus negative electrode are configured to receive a direct current. An alternating current side of the inverter circuit includes an alternating current output terminal, and the output terminal is configured to output an alternating current. The method may include:

obtaining, from the alternating current output terminal, an instantaneous current value at each sampling point moment in target sampling duration and an instantaneous value of each-phase current at a target moment, where the target sampling duration is sampling duration that uses the target moment as an end moment;

determining a valid current value of the target sampling duration based on the instantaneous current value at each sampling point moment, determining an upper switching frequency limit and a lower switching frequency limit of an $N^{th}$ switching period based on the valid current value, and determining a target instantaneous current value $I_N$ based on the instantaneous value of each-phase current at the target moment; and determining a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period, where $F_{ND} \leq f_N \leq F_{NU}$, the target switching frequency is used to control the switch component, and N is an integer greater than 1.

If $I_N > I_{N-1}$, and $F_{ND} \leq f_{N-1} \leq F_{NU}$, $f_N > f_{N-1}$; or if $I_N < I_{N-1}$, and $F_{ND} \leq f_{N-1} \leq F_{NU}$, $f_N$ is less than $f_{N-1}$, where $f_{N-1}$ is a target switching frequency of an $(N-1)^{th}$ switching period, and $I_{N-1}$ is a target instantaneous current value of the $(N-1)^{th}$ switching period.

It can be learned from the second aspect that the photovoltaic inverter may determine the upper switching frequency limit and the lower switching frequency limit by using the valid current value, and determine the target switching frequency between the upper switching frequency limit and the lower switching frequency limit based on a comparison of the target instantaneous current value with an instantaneous current value of a previous switching period, to ensure that the target switching frequency is greater than a switching frequency of the previous switching period when a target instantaneous current is greater than an instantaneous current of the previous switching period, and ensure that the target switching frequency is less than the switching frequency of the previous switching period when the target instantaneous current is less than the instantaneous current of the previous switching period. In this way, the target switching frequency determined by using the instantaneous current can be more adapted to a parameter of a filter in the inverter circuit, thereby ensuring grid-connected stability. In addition, the target switching frequency is related to the upper switching frequency limit and the lower switching frequency limit that are determined by using the valid current value, so that conversion efficiency of the photovoltaic inverter can be further improved on the whole.

With reference to the second aspect, in a first possible implementation, the determining a valid current value of the target sampling duration based on the instantaneous current value at each sampling point moment, determining an upper switching frequency limit and a lower switching frequency limit of an $N^{th}$ switching period based on the valid current value, and determining a target instantaneous current value $I_N$ based on the instantaneous value of each-phase current at the target moment may include:
  determining the valid current value of the target sampling duration based on the instantaneous current value at each sampling point moment in the target sampling duration, determining a maximum value of an absolute instantaneous current value based on the instantaneous value of each-phase current at the target moment, and determining the maximum value of the absolute instantaneous current value as the target instantaneous current value $I_N$ of the $N^{th}$ switching period.

With reference to the first possible implementation of the second aspect, in a second possible implementation, the determining a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period may include:
  determining, based on the valid current value of the target sampling duration, a first mapping relationship, and a second mapping relationship, an upper switching frequency limit $F_{NU}$ and a lower switching frequency limit $F_{ND}$ that correspond to the valid current value of the target sampling duration, where the first mapping relationship is a mapping relationship between an upper switching frequency limit and a valid current value, the second mapping relationship is a mapping relationship between a lower switching frequency limit and a valid current value, the upper switching frequency limit in the first mapping relationship first decreases and then increases as the valid current value increases, and the lower switching frequency limit in the second mapping relationship first decreases and then increases as the valid current value increases; and
  determining $f_N$ based on $F_{NU}$, $F_{ND}$, and the maximum value of the absolute instantaneous current value.

It can be learned from the second possible implementation of the second aspect that change trends of the first mapping relationship and the second mapping relationship are both first decreasing and then increasing as the valid current value increases. In this way, on the premise of ensuring grid-connected stability, a part that is first reduced with the increase of the current can effectively reduce a loss of the switch component, thereby improving overall conversion efficiency of the photovoltaic inverter.

With reference to the first or the second possible implementation of the second aspect, in a third possible implementation, the method may further include: generating a control signal of the switch component based on the target switching frequency, where the control signal is used to control on/off of the switch component.

With reference to the second possible implementation of the second aspect, in a fourth possible implementation, the determining $f_N$ based on the upper switching frequency limit $F_{NU}$, $F_{ND}$, and the maximum value of the absolute instantaneous current value may include:
  determining $F_{NU}$ as $f_N$ of the $N^{th}$ switching period when an absolute deviation value between the maximum value of the absolute instantaneous current value and times the valid current value is less than a first preset value.

With reference to the second possible implementation of the second aspect, in a fifth possible implementation, the determining $f_N$ based on the upper switching frequency limit $F_{NU}$, $F_{ND}$, and the maximum value of the absolute instantaneous current value may include:
  determining $F_{ND}$ as $f_N$ of the $N^{th}$ switching period when the output terminal outputs a three-phase alternating current, and when an absolute deviation value between the maximum value of the absolute instantaneous current value and $\sqrt{6}/2$ times the valid current value is less than a second preset value.

With reference to the second possible implementation of the second aspect, in a sixth possible implementation, the determining $f_N$ based on the upper switching frequency limit $F_{ND}$, $F_{ND}$, and the maximum value of the absolute instantaneous current value may include:
  determining $F_{ND}$ as $f_N$ of the $N^{th}$ switching period when the output terminal outputs a single-phase alternating current, and when an absolute deviation value between the maximum value of the absolute instantaneous current value and zero is less than a third preset value.

A third aspect of this application provides a photovoltaic inverter, including an inverter circuit, a sampling module, at least one processor, a memory, and computer-executable instructions that are stored in the memory and that may run on the processor. The sampling module may be a Hall sensor, and the sampling module may collect an instantaneous current of the inverter circuit. When the computer-executable instructions are executed by the processor, the processor performs the method according to any one of the second aspect or the possible implementations of the second aspect.

A fourth aspect of this application provides a computer readable storage medium. The computer readable storage medium stores instructions, and when the instructions are run on a computer, the computer is enabled to perform the method according to any one of the second aspect or the possible implementations of the second aspect.

Still another aspect of this application provides a computer program product including instructions. When the computer program product is run on a computer, the computer is enabled to perform the method according to any one of the second aspect or the possible implementations of the second aspect.

The photovoltaic inverter provided in the embodiments of this application may determine the upper switching frequency limit and the lower switching frequency limit by using the valid current value, and determine the target switching frequency between the upper switching frequency limit and the lower switching frequency limit based on a comparison of the target instantaneous current value with an instantaneous current value of a previous switching period, to ensure that the target switching frequency is greater than a switching frequency of the previous switching period when a target instantaneous current is greater than an instantaneous current of the previous switching period, and ensure that the target switching frequency is less than the switching frequency of the previous switching period when the target instantaneous current is less than the instantaneous current of the previous switching period. In this way, the target switching frequency determined by using the instantaneous current can be more adapted to a parameter of a filter in the inverter circuit, thereby ensuring grid-connected stability. In addition, the target switching frequency is related to the upper switching frequency limit and the lower switching frequency limit that are determined by using the valid current value, so that conversion efficiency of the photovoltaic inverter can be further improved on the whole.

DESCRIPTION OF EMBODIMENTS

The following describes embodiments of this application with reference to the accompanying drawings. It is clear that the described embodiments are merely a part rather than all of the embodiments of this application. A person of ordinary skill in the art may know that, with development of technologies and emergence of new scenarios, the technical solutions provided in the embodiments of this application are also applicable to similar technical problems.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Embodiments of this application provide a photovoltaic inverter and a corresponding switching frequency control method, to improve conversion efficiency of the photovoltaic inverter on the premise of ensuring grid-connected stability. The following separately provides detailed descriptions.

A photovoltaic power generation system may include a plurality of components, such as a photovoltaic string, a photovoltaic inverter, and a cable. The photovoltaic inverter may convert a direct current output by the photovoltaic string into an alternating current available in a power grid. The photovoltaic string is a direct current power supply including a plurality of photovoltaic modules connected in series by using positive and negative electrodes. The photovoltaic module is a direct current power supply including solar cells packed and connected in series and in parallel.

The photovoltaic power generation system may have a plurality of application scenarios. The following describes the photovoltaic power generation system by using several application scenarios in FIG. 1 to FIG. 3 as examples.

Figure 1:
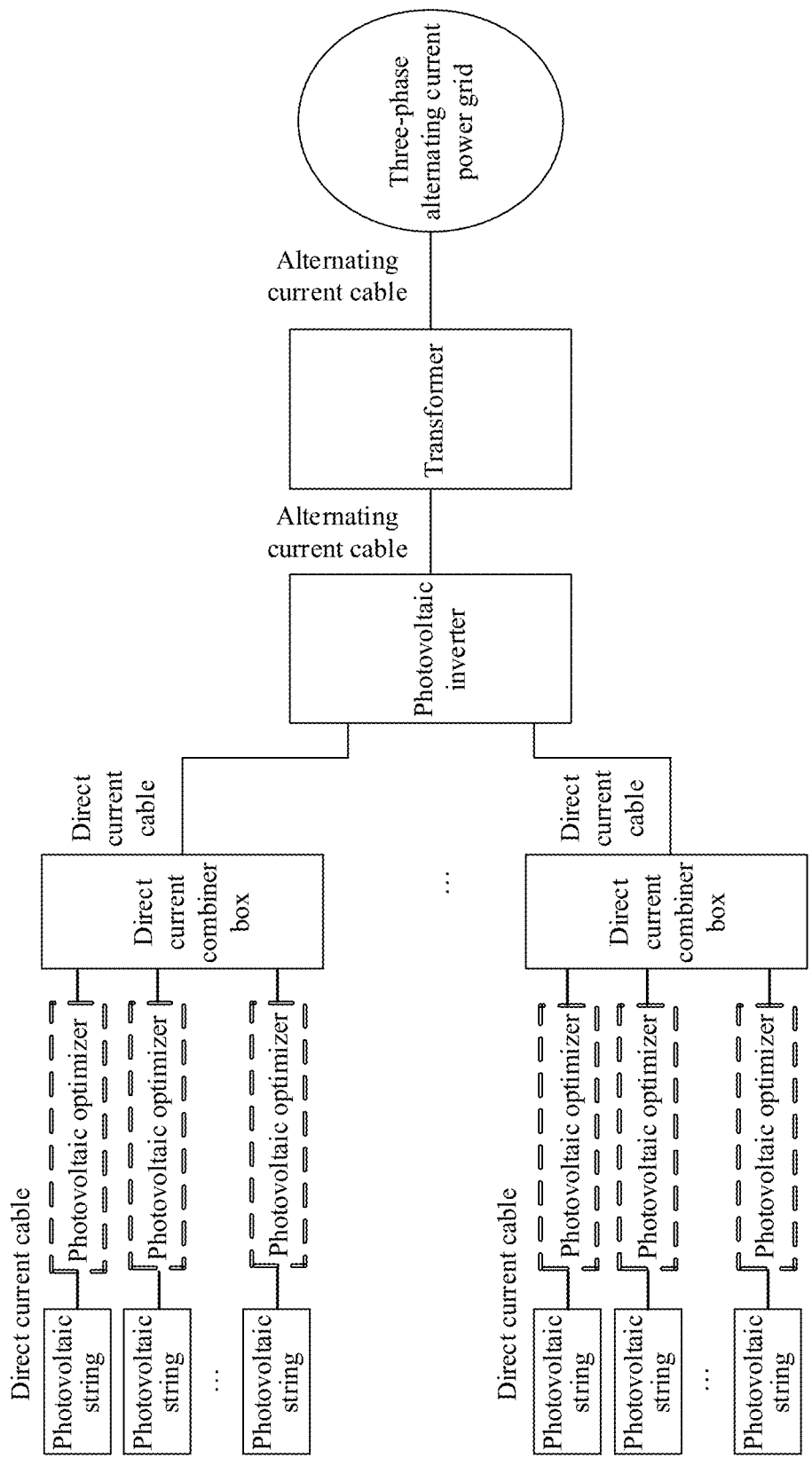
FIG. 1 is a schematic diagram of an application scenario of a photovoltaic power generation system of a centralized inverter.

FIG. 1 is a schematic diagram of an application scenario of a photovoltaic power generation system of a centralized inverter.

As shown in FIG. 1, the photovoltaic power generation system includes a plurality of photovoltaic strings, a direct current combiner box, a photovoltaic inverter, a transformer, a three-phase alternating current power grid, a direct current cable, and an alternating current cable. The photovoltaic power generation system may further include a photovoltaic optimizer.

Each photovoltaic string may be connected to the photovoltaic optimizer by using the direct current cable, and further connected to the direct current combiner box. If there is no photovoltaic optimizer, each photovoltaic string may be directly connected to the direct current combiner box. A connection relationship between the photovoltaic string and the photovoltaic optimizer may be a one-to-one connection. The direct current combiner box may combine currents of a plurality of photovoltaic strings. For example, one direct current combiner box combines currents of five photovoltaic strings, and if a current of each photovoltaic string is 10 A, a current obtained after combination by the direct current combiner box is 50 A. There may also be a plurality of direct current combiner boxes, and a quantity of the direct current combiner boxes may be determined based on a quantity of the photovoltaic strings. The direct current combiner box may be connected to the photovoltaic inverter by using the direct current cable, and the photovoltaic inverter converts a direct current into an alternating current. An alternating current side of the photovoltaic inverter is connected to the transformer by using the alternating current cable, and the transformer is connected to the three-phase alternating current power grid by using the alternating current cable. The alternating current output by the photovoltaic inverter flows to the three-phase alternating current power grid after passing through the transformer.

Figure 2:
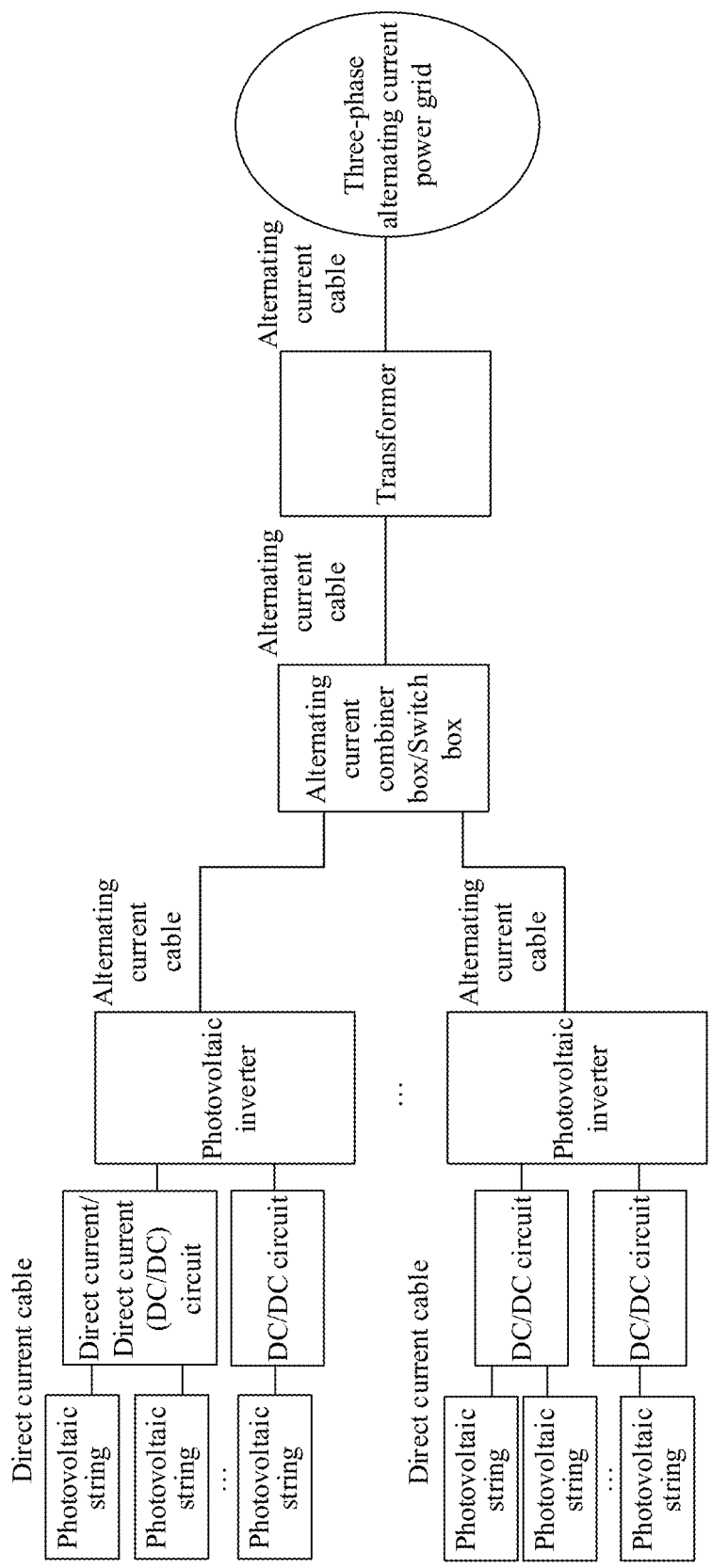
FIG. 2 is a schematic diagram of an application scenario of a photovoltaic power generation system of a string inverter.

FIG. 2 is a schematic diagram of an application scenario of a photovoltaic power generation system of a string inverter.

As shown in FIG. 2, the photovoltaic power generation system of the string inverter may include a photovoltaic string, a direct current/direct current (DC/DC) circuit, a photovoltaic inverter, an alternating current combiner box/switch box, a transformer, a three-phase alternating current power grid, a direct current cable, and an alternating current cable.

Each photovoltaic string may be connected to the DC/DC circuit by using the direct current cable, and one DC/DC circuit may be connected to one photovoltaic string, or may be connected to two or more photovoltaic strings. The DC/DC circuit is connected to the photovoltaic inverter by using the direct current cable. The photovoltaic inverter converts a direct current into an alternating current, and the photovoltaic inverter is connected to the alternating current combiner box/switch box by using the alternating current cable. In the scenario shown in FIG. 2, combination is performed on an alternating current side. In the scenario shown in FIG. 1, combination is performed on a direct current side. The alternating current combiner box/switch box is connected to the transformer by using the alternating current cable, and the transformer is further connected to the three-phase alternating current power grid by using the alternating current cable. In this way, currents of a plurality of photovoltaic strings can flow to the three-phase alternating current power grid in the foregoing process.

Figure 3:
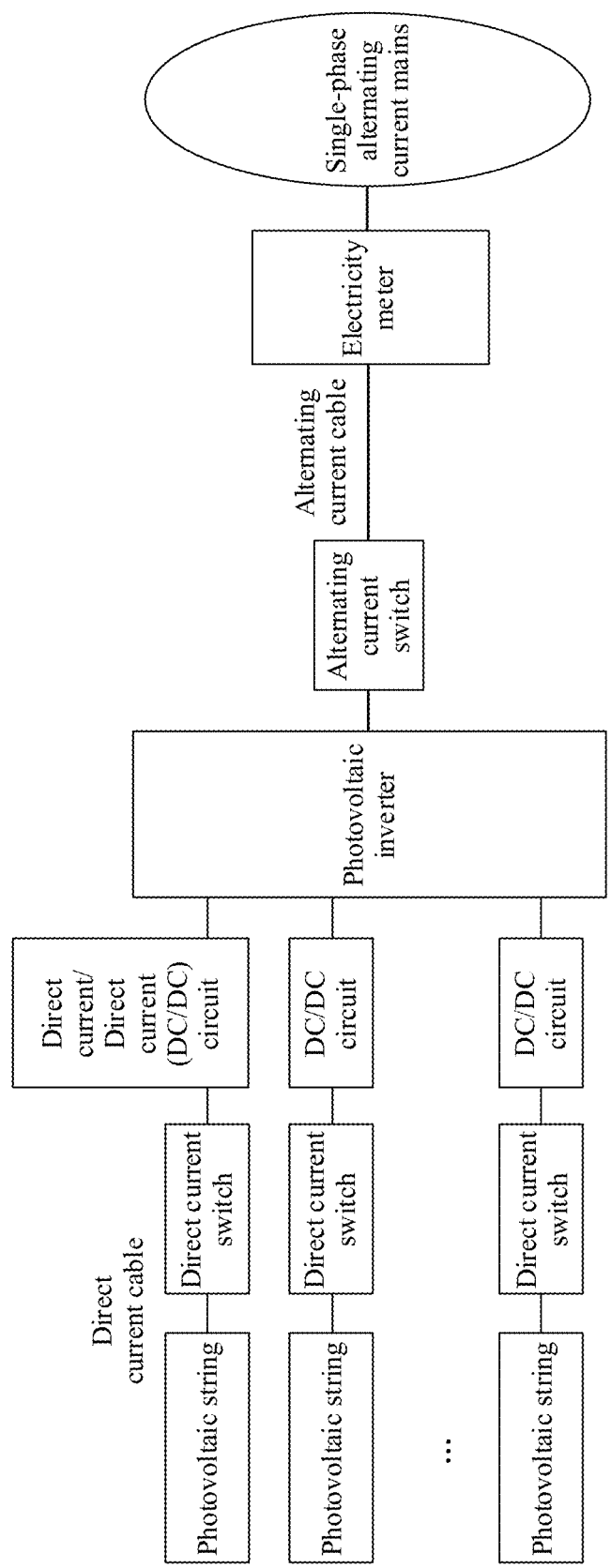
FIG. 3 is a schematic diagram of an application scenario of a household single-phase photovoltaic power generation system.

FIG. 3 is a schematic diagram of an application scenario of a household single-phase photovoltaic power generation system.

The household single-phase photovoltaic power generation system is generally a system to home. The photovoltaic power generation system includes a photovoltaic string, a direct current switch, a direct current/direct current (DC/DC) circuit, a photovoltaic inverter, an alternating current switch, an electricity meter, single-phase alternating current mains, a direct current cable, and an alternating current cable.

In the household single-phase photovoltaic power generation system, the photovoltaic string is connected to the direct current switch by using the direct current cable, and the direct current switch is connected to the DC/DC circuit by using the direct current cable. The photovoltaic string, the direct current switch, and the DC/DC circuit are connected in a one-to-one relationship. Each DC/DC circuit is connected to the photovoltaic inverter, and the photovoltaic inverter converts a direct current into an alternating current and then outputs the alternating current. The photovoltaic inverter is connected to the alternating current switch, the alternating current switch is connected to the electricity meter by using the alternating current cable, and the electricity meter is connected to the single-phase alternating current mains. The alternating current output by the photovoltaic inverter flows to the single-phase alternating current mains through the alternating current switch and the electricity meter.

The photovoltaic power generation systems described in FIG. 1 to FIG. 3 all include a photovoltaic inverter, one side of the photovoltaic inverter is a direct current side, and the other side is an alternating current side. The photovoltaic inverter receives a direct current of a photovoltaic string by using the direct current side, then converts the direct current into an alternating current, and outputs the alternating current by using the alternating current side.

The photovoltaic inverter includes an inverter circuit, the inverter circuit is configured to convert a direct current into an alternating current, and the inverter circuit includes a plurality of switch components. In a process of converting a direct current into an alternating current, because the current transmitted by the photovoltaic string is unstable, the switch components sometimes need to be opened and sometimes need to be closed, to avoid damage to another electronic component in the inverter circuit due to the unstable current. Either opening or closing of the switch component causes a loss, thereby affecting energy conversion efficiency. It can be learned that a switching frequency of the switch component affects the energy conversion efficiency. In addition, if the switching frequency of the switch component is improperly matched with a parameter of a filter of the inverter circuit, grid-connected stability of the photovoltaic inverter is further affected. The conversion efficiency refers to a percentage of output power of the photovoltaic inverter to input power of the photovoltaic inverter. The grid-connected stability means that the inverter is not shut down, damaged, or the like due to a mismatch of the switching frequency, the current, or the like.

The switch component in this embodiment of this application may be a controllable power electronic switch component, for example, may be an insulated gate bipolar transistor (IGBT), an integrated gate commutated thyristor (IGCT), or a gate turn-off thyristor (GTO).

It may be understood that FIG. 1 to FIG. 3 are merely the three scenarios listed. Actually, the solutions in the embodiments of this application are not limited to the three scenarios. The solutions provided in the embodiments of this application may be applied to more photovoltaic power generation scenarios.

Figure 4:
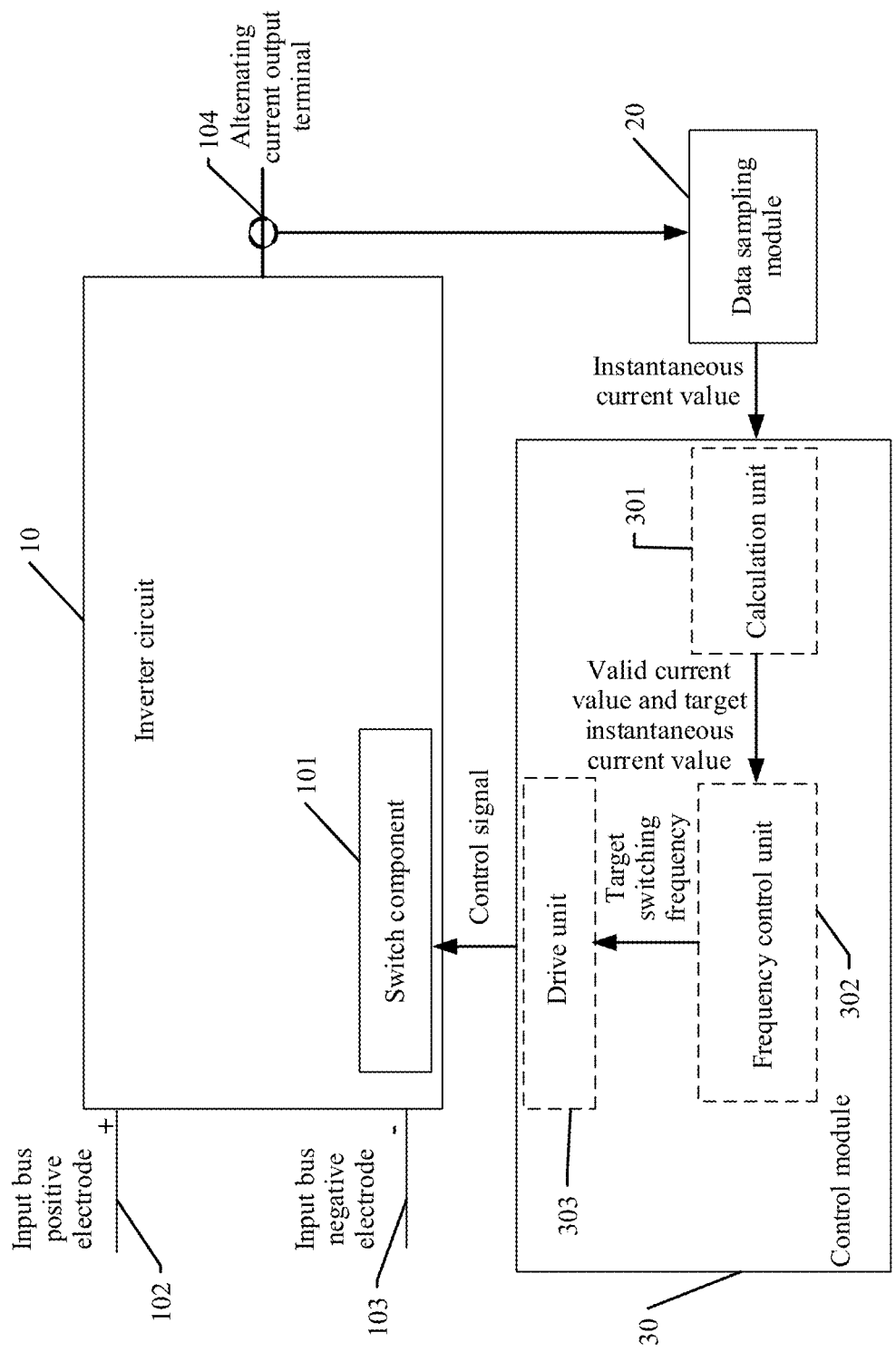
FIG. 4 is a schematic diagram of an embodiment of a photovoltaic inverter according to an embodiment of this application.

FIG. 4 is a schematic diagram of an embodiment of a photovoltaic inverter according to an embodiment of this application.

As shown in FIG. 4, an embodiment of the photovoltaic inverter provided in this embodiment of this application may include an inverter circuit 10, a data sampling module 20, and a control module 30.

The inverter circuit 10 includes a switch component 101, and the switch component 101 is configured to control on/off of the inverter circuit. A direct current side of the inverter circuit 10 may include an input bus positive electrode 102 and an input bus negative electrode 103, and the input bus positive electrode 102 and the input bus negative electrode 103 are configured to receive a direct current. An alternating current side of the inverter circuit 10 includes an alternating current output terminal 104, and the alternating current output terminal 104 is configured to output an alternating current.

The data sampling module 20 is configured to collect, from the alternating current output terminal 104, an instantaneous current value at each sampling point moment in target sampling duration and an instantaneous value of each-phase current at a target moment, where the target sampling duration is sampling duration that uses the target moment as an end moment.

The control module 30 is configured to:
determine a valid current value of the target sampling duration based on the instantaneous current value at each sampling point moment, determine an upper switching frequency limit and a lower switching frequency limit of an $N^{th}$ switching period based on the valid current value, and determine a target instantaneous current value $I_N$ based on the instantaneous value of each-phase current at the target moment; and determine a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period, where $F_{ND} \leq f_N \leq F_{NU}$, the target switching frequency is used to control the switch component, and N is an integer greater than 1.

If $I_N > I_{N-1}$, and $F_{ND} \leq f_{N-1} \leq F_{NU}$, $f_N > f_{N-1}$; or if $I_N < I_{N-1}$, and $F_{ND} \leq f_{N-1} \leq F_{NU}$, $f_N$ is less than $f_{N-1}$, where $f_{N-1}$ is a target switching frequency of an $(N-1)^{th}$ switching period, and $I_{N-1}$ is a target instantaneous current value of the $(N-1)^{th}$ switching period.

It can be learned from the foregoing description content that, for two consecutive switching periods, if a target switching frequency $f_{N-1}$ of a former switching period is between upper and lower limits of a latter switching period, a target switching frequency of the latter switching period may be determined based on a comparison between target instantaneous current values of the two consecutive switching periods. When a target instantaneous current value of the latter switching period is greater than a target instantaneous current value of the former switching period, the target switching frequency of the latter switching period is also greater than the target switching frequency of the former switching period. Conversely, if the target instantaneous current value of the latter switching period is less than the target instantaneous current value of the former switching period, the target switching frequency of the latter switching period is also less than the target switching frequency of the former switching period. If the target switching frequency of the former switching period is not between the upper and lower limits of the latter switching period, no comparison is needed, and the target switching frequency of the latter switching period may be selected within the upper and lower limits of the target switching frequency of the latter switching period based on the target instantaneous current value.

The photovoltaic inverter provided in this embodiment of this application may determine the upper switching frequency limit and the lower switching frequency limit by using the valid current value, and determine the target switching frequency between the upper switching frequency limit and the lower switching frequency limit based on a comparison of the target instantaneous current value with an instantaneous current value of a previous switching period, to ensure that the target switching frequency is greater than a switching frequency of the previous switching period when a target instantaneous current is greater than an instantaneous current of the previous switching period, and ensure that the target switching frequency is less than the switching frequency of the previous switching period when the target instantaneous current is less than the instantaneous current of the previous switching period. In this way, the target switching frequency determined by using the instantaneous current can be more adapted to a parameter of a filter in the inverter circuit, thereby ensuring grid-connected stability. In addition, the target switching frequency is related to the instantaneous current, so that conversion efficiency of the photovoltaic inverter can be further improved on the whole.

In some embodiments, the control module 30 may include one or a combination of a calculation unit 301, a frequency control unit 302, and a drive unit 303.

The calculation unit 301 is configured to: determine the valid current value of the target sampling duration based on the instantaneous current value at each sampling point moment in the target sampling duration, determine a maximum value of an absolute instantaneous current value based on the instantaneous value of each-phase current at the target moment, and determine the maximum value of the absolute instantaneous current value as the target instantaneous current value $I_N$ of the $N^{th}$ switching period.

In this embodiment of this application, the target moment may be marked as a moment t, and the moment is a time point. A total length of the target sampling duration may be T. For example, T may be a time length of a power grid period, and within the duration of T, there may be hundreds of sampling points. Certainly, a quantity of sampling points may be set as required, and may be larger or smaller. Certainly, the target sampling duration is not limited to T, may be greater than T or less than T, and may be set based on an actual situation. The sampling module 20 may perform collection once when a sampling point moment is reached, and then store collected data, which may be stored in the calculation unit, or may be stored in another storage unit. When the calculation unit obtains the instantaneous value of each-phase current at the moment t, the calculation unit uses the moment t as the end moment of the target sampling duration to extract the instantaneous current value at each sampling point moment in the forward duration T, and then performs calculation. Because a power grid includes a three-phase power grid and a single-phase power grid, the sampling module 20 performs sampling for each phase during sampling, and an instantaneous value of each-phase output current of the photovoltaic inverter at the moment t may be expressed as $i_p(t)$. A subscript p represents a phase sequence number.

The calculation unit 301 may calculate a valid current value Irms of a current power grid period (whose time length is T) of the photovoltaic inverter based on collected instantaneous current values of the moment t and one power grid period T before the moment t and based on the following formula:

$$I_{rms} = \sqrt{\int_{t-T}^{t} \frac{i_p^2(\tau)}{T} d\tau}$$

If a single-phase power grid is used, there is only one phase, and Irms of only one phase needs to be calculated. If a three-phase power grid is used, because structures of three phases are symmetrical, values are generally the same. The valid current value Irms may still be determined by calculating only one phase. Certainly, valid current values of all the three phases may alternatively be calculated, and then a final valid current value of the three phases may be calculated through averaging.

The maximum value of the absolute instantaneous current value is determined based on the instantaneous value of each-phase current at the target moment, and a maximum value $|i(t)|max$ of an absolute instantaneous value of each-phase current at the moment t of the photovoltaic inverter may be calculated based on the following formula:

$$|i(t)|_{max} = \max_{p=1,2,3} \{|i_p(t)|\}$$

The frequency control unit 302 is configured to:
determine, based on the valid current value of the target sampling duration, a first mapping relationship, and a second mapping relationship, an upper switching frequency limit $F_{NU}$ and a lower switching frequency limit $F_{ND}$ that correspond to the valid current value of the target sampling duration, where the first mapping relationship is a mapping relationship between an upper switching frequency limit and a valid current value, the second mapping relationship is a mapping relationship between a lower switching frequency limit and a valid current value, the upper switching frequency limit in the first mapping relationship first decreases and then increases as the valid current value increases, and the lower switching frequency limit in the second mapping relationship first decreases and then increases as the valid current value increases; and determine $f_N$ based on $F_{NU}$, $F_{ND}$, and the maximum value of the absolute instantaneous current value.

In this embodiment of this application, the first mapping relationship and the second mapping relationship may be recorded in a table form, or may be recorded in a function relationship. A representation form of the first mapping relationship and the second mapping relationship recorded in the table form may be shown in Table 1.

TABLE 1

Table of the first mapping relationship and the second mapping relationship

| Valid current value (rated current $I_R$) | 0% $I_R$ | 30% $I_R$ | 50% $I_R$ | 70% $I_R$ | 100% $I_R$ |
|---|---|---|---|---|---|
| Upper switching frequency limit (rated frequency $F_R$) | 1.1 $F_R$ | 1 $F_R$ | 0.7 $F_R$ | 0.9 $F_R$ | 1.1 $F_R$ |
| Lower switching frequency limit | 0.9 $F_R$ | 0.8 $F_R$ | 0.5 $F_R$ | 0.7 $F_R$ | 0.9 $F_R$ |

The valid current value in Table 1 is represented by a percentage relationship with the rated current IR. The upper switching frequency limit and the lower switching frequency limit are represented by a multiple relationship with the rated frequency FR. Table 1 only lists the foregoing five levels. Actually, the valid current value, the upper switching frequency limit, and the lower switching frequency limit are not limited to the five levels listed in Table 1, and a division granularity may be finer. The description herein is merely an example, and should not be understood as a limitation on the first mapping relationship and the second mapping relationship.

In addition, it should be noted that differences between the upper switching frequency limits and the lower switching frequency limits in Table 1 are all 0.2 FR. This is also merely an example for representation herein, and the differences between the upper switching frequency limits and the lower switching frequency limits may be the same or different. A specific difference is not limited to 0.2 FR listed in Table 1, which should not be understood as a limitation on the first mapping relationship and the second mapping relationship.

Figure 5:
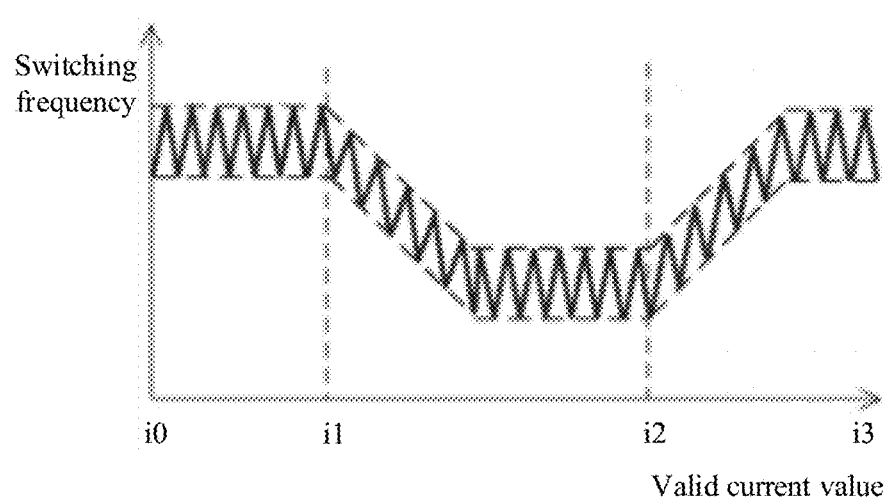
FIG. 5 is a schematic diagram of a mapping relationship between a valid current value and a switching frequency according to an embodiment of this application.

It can also be learned from Table 1 that the upper switching frequency limit in the first mapping relationship first decreases and then increases as the valid current value increases, and the lower switching frequency limit in the second mapping relationship first decreases and then increases as the valid current value increases. This trend may also be understood with reference to FIG. 5. As shown in FIG. 5, in an interval in which the valid current value increases from i0 to i1, the switching frequency is relatively large. In an interval in which the valid current value increases from i1 to i2, the switching frequency first greatly decreases and then gradually stabilizes. In an interval in which the valid current value increases from i2 to i3, the switching frequency first rapidly increases and then gradually stabilizes.

The first mapping relationship may be represented as $F_U$=G(Irms) in a form of a function, and the second mapping relationship may be represented as $F_D$=G(Irms) in a form of a function.

After the upper switching frequency limit $F_{NU}$ and the lower switching frequency limit $F_{ND}$ of the $N^{th}$ switching period are determined, $f_N$ may be determined with reference to the maximum value of the absolute instantaneous current value.

There may be a plurality of manners for determining $f_N$, for example:

In some embodiments, the frequency control unit 302 is configured to determine $F_{NU}$ as $f_N$ of the $N^{th}$ switching period when an absolute deviation value between the maximum value of the absolute instantaneous current value and times the valid current value is less than a first preset value.

In some embodiments, the frequency control unit 302 is configured to determine $F_{ND}$ as $f_N$ of the $N^{th}$ switching period when the output terminal outputs a three-phase alternating current, and when an absolute deviation value between the maximum value of the absolute instantaneous current value and $\sqrt{6}/2$ times the valid current value is less than a second preset value.

In some embodiments, the frequency control unit 302 is configured to determine $F_{ND}$ as $f_N$ of the $N^{th}$ switching period when the output terminal outputs a single-phase alternating current, and when an absolute deviation value between the maximum value of the absolute instantaneous current value and zero is less than a third preset value.

The first preset value, the second preset value, and the third preset value may be the same or different. Values of the first preset value, the second preset value, and the third preset value may be less than $\sqrt{2}$Irms/2, are certainly not limited to specific values in this embodiment of this application, and may be values greater than or less than $\sqrt{2}$Irms/2.

The foregoing enumeration is performed by using the moment t as an example. In a working process of the photovoltaic inverter, there is a plurality of such moments t, and a target switching frequency at each moment t may be different. It may be understood that, at different moments t, sometimes |i(t)|max is relatively large, sometimes |i(t)|max is relatively small, and target switching frequencies respectively corresponding to these moments t are also different.

In a switching period in which an absolute deviation value between |i(t)|max and $\sqrt{2}I_{rms}$ is less than the first preset value, a target switching frequency is an upper switching frequency limit of the switching period.

When an output end of the photovoltaic inverter has three phases, in a switching period in which an absolute deviation value between |i(t)|max and $\sqrt{6}I_{rms}/2$ is less than the second preset value, a target switching frequency is a lower switching frequency limit of the switching period. An included angle between any two of the three phases is 120 degree, and $\sqrt{2}I_{rms}/2$ is $\sqrt{2}I_{rms}$*sin 120°.

When the output end of the photovoltaic inverter has a single phase, there is no phase difference. Therefore, in a switching period in which an absolute deviation value between |i(t)|max and 0 is less than the third preset value, a target switching frequency is a lower switching frequency limit of the switching period.

In addition to the several target switching frequencies listed above, if relationships between |i(t)|max and the foregoing several valid current values do not meet the foregoing several conditions, a switching frequency may be determined between the upper switching frequency limit and the lower switching frequency limit of the switching period. For example, an intermediate value between the upper switching frequency limit and the lower switching frequency limit is used as the target switching frequency of the switching period.

The drive unit 303 is configured to generate a control signal of the switch component based on the target switching frequency, where the control signal is used to control on/off of the switch component.

Figure 6:
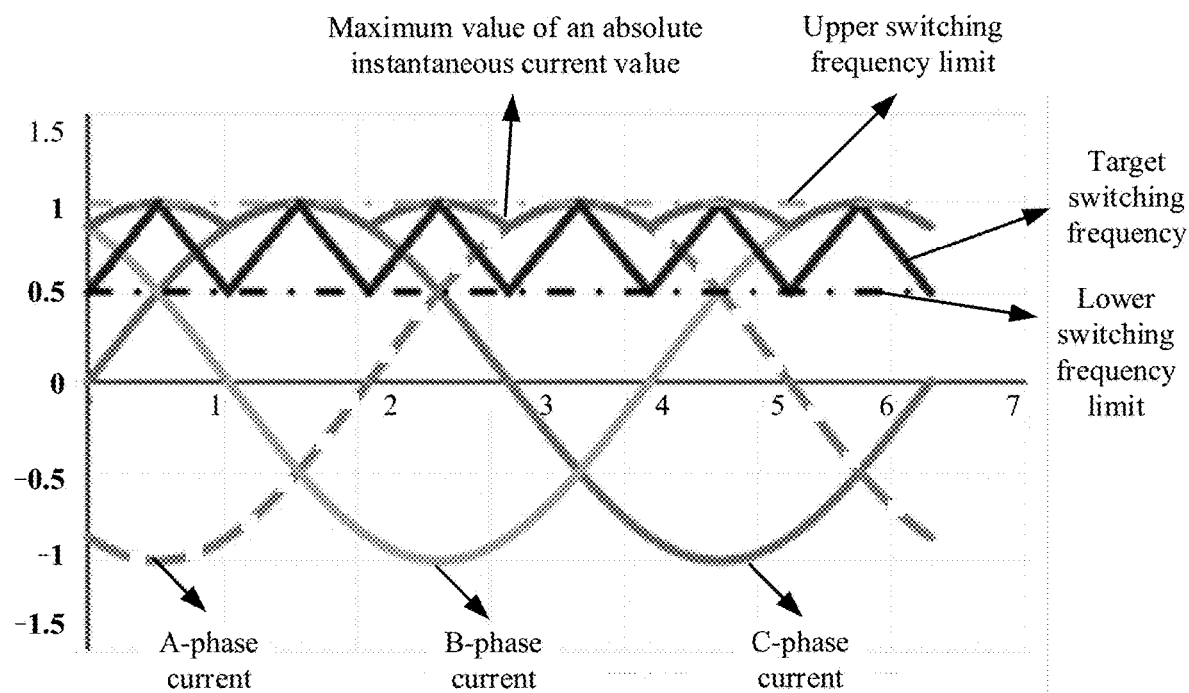
FIG. 6 is a schematic diagram of a variation of a target switching frequency with a maximum value of a three-phase current according to an embodiment of this application.
Figure 7:
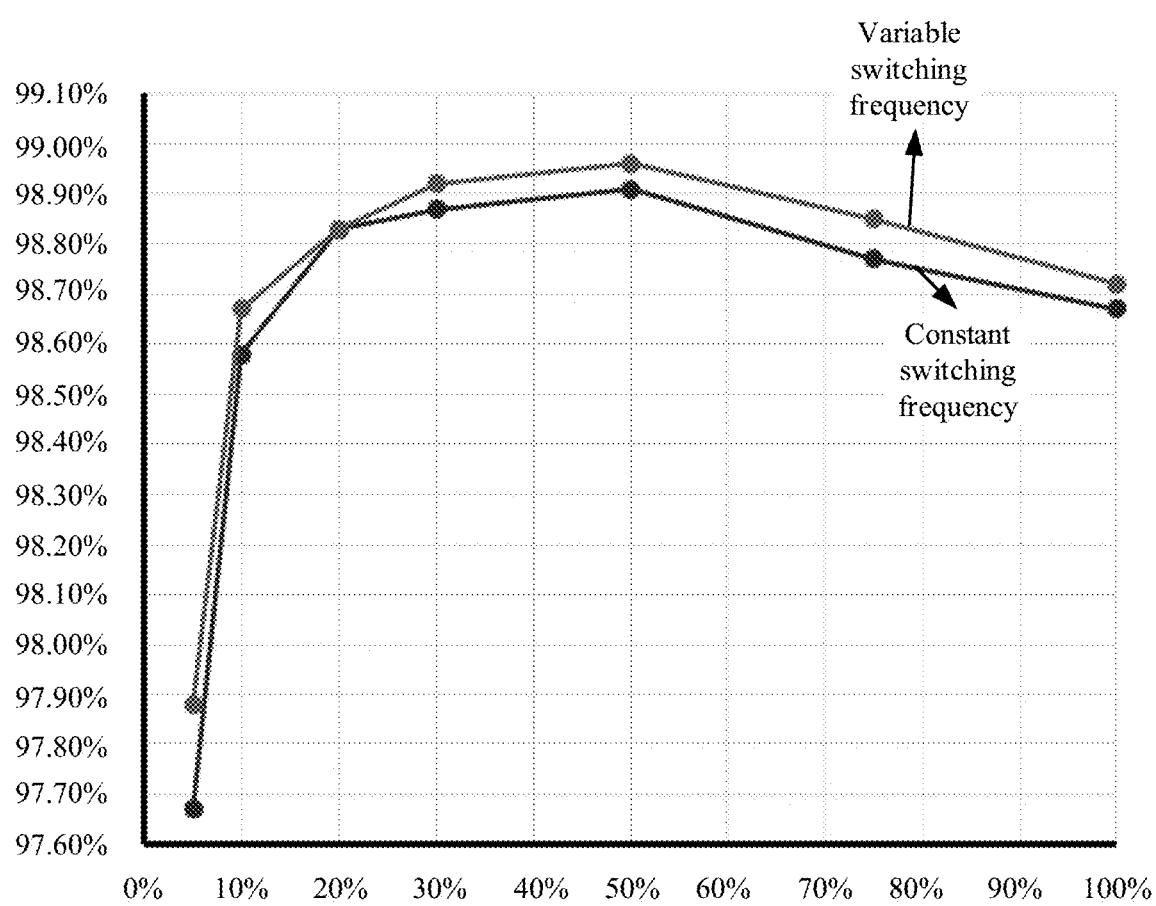
FIG. 7 is a schematic diagram of a conversion efficiency comparison between a variable switching frequency and a constant switching frequency according to an embodiment of this application.

When there is a three-phase current, a relationship between a maximum value of an absolute instantaneous current value of the three-phase current and a target switching frequency may be further understood with reference to FIG. 6. It can be learned from FIG. 6 that the three-phase current includes an A-phase current, a B-phase current, and a C-phase current. The maximum value of the absolute instantaneous current value may be determined from a current waveform, and the target switching frequency varies with the maximum value of the absolute instantaneous current value and between the upper switching frequency limit and the lower switching frequency limit. It can be learned from FIG. 6 that a change trend of the target switching frequency is consistent with a change trend of the maximum value of the absolute instantaneous current value in the three phases, the target switching frequency increases when the maximum value of the absolute instantaneous current value in the three phases increases, and the target switching frequency decreases when the maximum value of the absolute instantaneous current value in the three phases decreases.

It can be learned from FIG. 5 and FIG. 6 that the target switching frequency may vary between the upper switching frequency limit and the lower switching frequency limit. In this way, when the valid current value is very small, an iron loss of the filter accounts for a main part of a loss, and the switching frequency varies between greater upper and lower limits, helping reduce the iron loss, and improving the conversion efficiency. When the valid current value increases, the upper and lower switching frequency limits first decrease, helping reduce a switching loss, and improving the conversion efficiency. When the valid current value is very large and close to a full load, the upper and lower switching frequency limits increase, helping ensure that the switching frequency is away from a resonance frequency of the filter, and avoiding control instability.

The foregoing plurality of embodiments describe a process of determining the target switching frequency of the photovoltaic inverter. The target switching frequency may be different in different switching periods. Actually, the target switching frequency may further affect a control frequency of the frequency control unit 302 and a calculation frequency of the calculation unit 301. That is, the control frequency of the frequency control unit 302 is used to adjust a next frequency control time, and the calculation frequency may be used to adjust a next calculation time based on the target switching frequency. This is more conducive to accurate calculation, and there is no need to perform calculation once in a relatively small time interval, thereby saving calculation resources.

Figure 8:
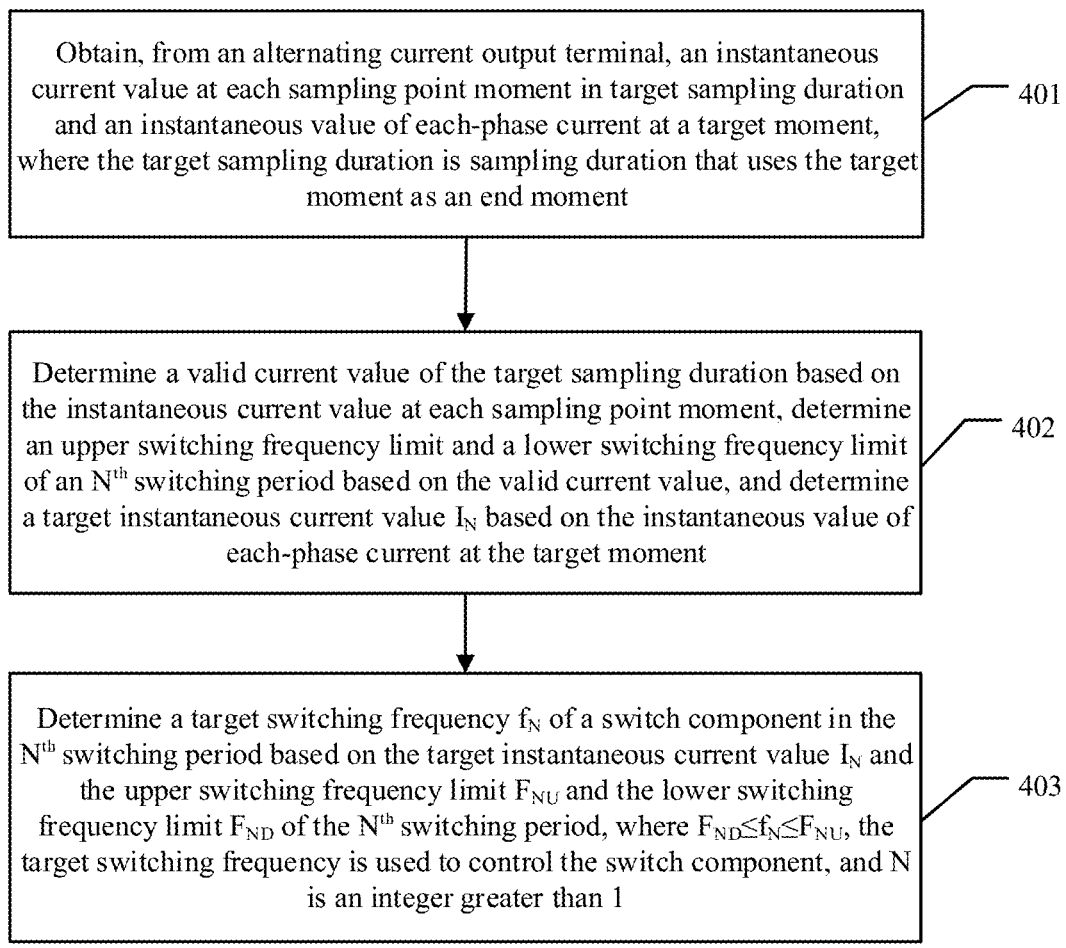
FIG. 8 is a schematic diagram of an embodiment of a switching frequency control method according to an embodiment of this application.

Based on the foregoing photovoltaic inverter, an embodiment of this application further provides a switching frequency control method. FIG. 8 shows an embodiment of the switching frequency control method according to this embodiment of this application. The method is applied to the photovoltaic inverter described in FIG. 4, and the photovoltaic inverter includes an inverter circuit. The inverter circuit includes a switch component, and the switch component is configured to control on/off of the inverter circuit. A direct current side of the inverter circuit includes an input bus positive electrode and an input bus negative electrode, and the input bus positive electrode and the input bus negative electrode are configured to receive a direct current. An alternating current side of the inverter circuit includes an alternating current output terminal. The method may include:

401: Obtain, from the alternating current output terminal, an instantaneous current value at each sampling point moment in target sampling duration and an instantaneous value of each-phase current at a target moment, where the target sampling duration is sampling duration that uses the target moment as an end moment.

402: Determine a valid current value of the target sampling duration based on the instantaneous current value at each sampling point moment, determine an upper switching frequency limit and a lower switching frequency limit of an $N^{th}$ switching period based on the valid current value, and determine a target instantaneous current value $I_N$ based on the instantaneous value of each-phase current at the target moment.

403: Determine a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period, where $F_{ND} \leq f_N \leq F_{NU}$, the target switching frequency is used to control the switch component, and N is an integer greater than 1.

If $I_N > I_{N-1}$, and $F_{ND} \leq f_{N-1} \leq F_{NU}$, $f_N > f_{N-1}$; or if $I_N < I_{N-1}$, and $F_{ND} \leq f_{N-1} \leq F_{NU}$, $f_N$ is less than $f_{N-1}$, where $f_{N-1}$ is a target switching frequency of an $(N-1)^{th}$ switching period, and $I_{N-1}$ is a target instantaneous current value of the $(N-1)^{th}$ switching period.

According to the switching frequency control method provided in this embodiment of this application, the upper switching frequency limit and the lower switching frequency limit may be determined by using the valid current value, and the target switching frequency may be determined between the upper switching frequency limit and the lower switching frequency limit based on a comparison of the target instantaneous current value with an instantaneous current value of a previous switching period, to ensure that the target switching frequency is greater than a switching frequency of the previous switching period when a target instantaneous current is greater than an instantaneous current of the previous switching period, and ensure that the target switching frequency is less than the switching frequency of the previous switching period when the target instantaneous current is less than the instantaneous current of the previous switching period. In this way, the target switching frequency determined by using the instantaneous current can be more adapted to a parameter of a filter in the inverter circuit, thereby ensuring grid-connected stability. In addition, the target switching frequency is related to the instantaneous current, so that conversion efficiency of the photovoltaic inverter can be further improved on the whole.

In some embodiments, the determining a valid current value of the target sampling duration based on the instantaneous current value at each sampling point moment, determining an upper switching frequency limit and a lower switching frequency limit of an $N^{th}$ switching period based on the valid current value, and determining a target instantaneous current value $I_N$ based on the instantaneous value of each-phase current at the target moment may include:

determining the valid current value of the target sampling duration based on the instantaneous current value at each sampling point moment in the target sampling duration, determining a maximum value of an absolute instantaneous current value based on the instantaneous value of each-phase current at the target moment, and determining the maximum value of the absolute instantaneous current value as the target instantaneous current value $I_N$ of the $N^{th}$ switching period.

In some embodiments, the determining a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period may include:

determining, based on the valid current value of the target sampling duration, a first mapping relationship, and a second mapping relationship, an upper switching frequency limit $F_{NU}$ and a lower switching frequency limit $F_{ND}$ that correspond to the valid current value of the target sampling duration, where the first mapping relationship is a mapping relationship between an upper switching frequency limit and a valid current value, the second mapping relationship is a mapping relationship between a lower switching frequency limit and a valid current value, the upper switching frequency limit in the first mapping relationship first decreases and then increases as the valid current value increases, and the lower switching frequency limit in the second mapping relationship first decreases and then increases as the valid current value increases; and determining $f_N$ based on $F_{NU}$, $F_{ND}$, and the maximum value of the absolute instantaneous current value.

In some embodiments, the method may further include: generating a control signal of the switch component based on the target switching frequency, where the control signal is used to control on/off of the switch component.

In some embodiments, the determining $f_N$ based on the upper switching frequency limit $F_{NU}$, $F_{ND}$, and the maximum value of the absolute instantaneous current value may include:

determining $F_{NU}$ as $f_N$ of the $N^{th}$ switching period when an absolute deviation value between the maximum value of the absolute instantaneous current value and times the valid current value is less than a first preset value.

In some embodiments, the determining $f_N$ based on the upper switching frequency limit $F_{NU}$, $F_{ND}$, and the maximum value of the absolute instantaneous current value may include:

determining $F_{ND}$ as $f_N$ of the $N^{th}$ switching period when the output terminal outputs a three-phase alternating current, and when an absolute deviation value between the maximum value of the absolute instantaneous current value and $\sqrt{6}/2$ times the valid current value is less than a second preset value.

In some embodiments, the determining $f_N$ based on the upper switching frequency limit $F_{NU}$, $F_{ND}$, and the maximum value of the absolute instantaneous current value may include:

determining $F_{ND}$ as $f_N$ of the $N^{th}$ switching period when the output terminal outputs a single-phase alternating current, and when an absolute deviation value between the maximum value of the absolute instantaneous current value and zero is less than a third preset value.

For related content of the switching frequency control method provided in this embodiment of this application, refer to the corresponding descriptions of FIG. 4 to FIG. 7 for understanding. Details are not described herein.

In FIG. 4, the control module in the photovoltaic inverter is represented in a modular form. The control module may be implemented by using a chip, or may be implemented by using a processor, a memory, a communications interface, and a communications line together. The following describes another embodiment of a photovoltaic inverter according to an embodiment of this application with reference to FIG. 9.

Figure 9:
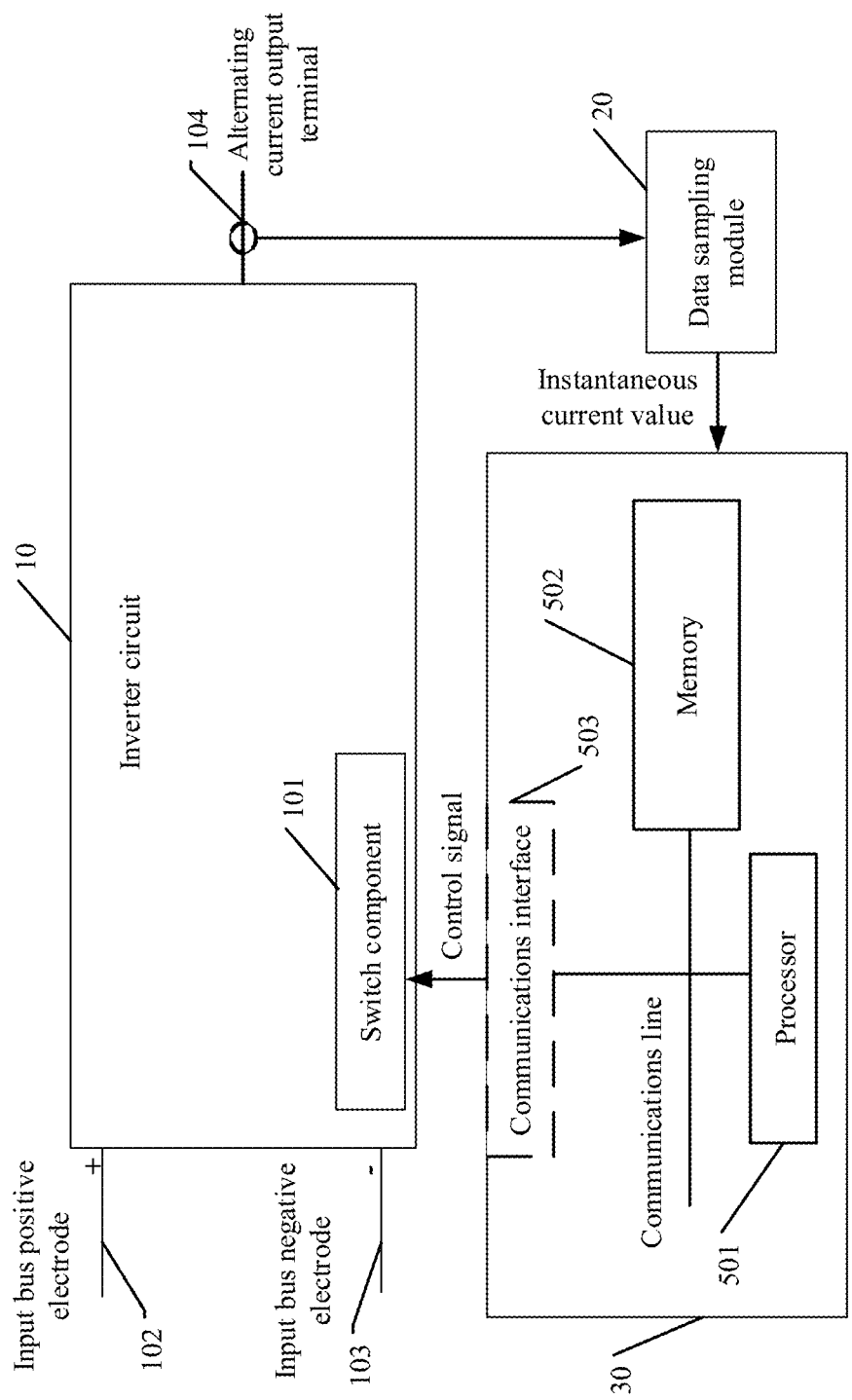
FIG. 9 is a schematic diagram of another embodiment of a photovoltaic inverter according to an embodiment of this application.

As shown in FIG. 9, another embodiment of the photovoltaic inverter provided in this embodiment of this application includes an inverter circuit 10, a data sampling module 20, a processor 501, a memory 502, a communications interface 503, and a communications line. The inverter circuit 10 includes a switch component 101, and the switch component 101 is configured to control on/off of the inverter circuit. A direct current side of the inverter circuit 10 may include an input bus positive electrode 102 and an input bus negative electrode 103, and the input bus positive electrode 102 and the input bus negative electrode 103 are configured to receive a direct current. An alternating current side of the inverter circuit 10 includes an alternating current output terminal 104, and the alternating current output terminal 104 is configured to output an alternating current. The data sampling module 20 is configured to collect, from the alternating current output terminal 104, an instantaneous current value at each sampling point moment in target sampling duration and an instantaneous value of each-phase current at a target moment, where the target sampling duration is sampling duration that uses the target moment as an end moment. The processor 501, the memory 502, and the communications interface 503 communicate by using the communications line. The memory may store a program for performing the switching frequency control method described in FIG. 8.

The processor 501 may be a general-purpose central processing unit (CPU), a microprocessor, an application-specific integrated circuit (ASIC), or one or more integrated circuits configured to control program execution in the solutions of this application.

The communications line may include a path for transmitting information between the foregoing components.

The memory 502 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a disk storage medium or another magnetic storage device, or any other medium capable of carrying or storing desired program code in a form of an instruction or a data structure and capable of being accessed by a computer, but is not limited thereto. The memory may exist independently, and is connected to the processor 501 by using the communications line. Alternatively, the memory 502 may be integrated with the processor 501.

The memory 502 is configured to store computer-executable instructions for executing the solutions of this application, and the processor 501 controls the execution. The processor 501 is configured to execute the computer-executable instructions stored in the memory 502, to perform the switching frequency control method provided in the foregoing method embodiment of this application.

In a possible implementation, the computer-executable instructions in this embodiment of this application may also be referred to as application code. This is not specifically limited in this embodiment of this application.

Each processor may be a single-CPU processor, or may be a multi-CPU processor. The processor herein may refer to one or more devices, circuits, and/or processing cores configured to process data (for example, the computer-executable instructions).

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person of ordinary skill in the art may understand that all or some of the steps of the methods in the embodiments may be implemented by a program instructing related hardware. The program may be stored in a computer-readable storage medium. The storage medium may include: a ROM, a RAM, a magnetic disk, or an optical disc, or the like.

The foregoing describes in detail the photovoltaic inverter and the switching frequency control method provided in the embodiments of this application. The principle and implementation of this application are described herein through specific examples. The description about the embodiments is merely provided to help understand the method and core ideas of this application. In addition, persons of ordinary skill in the art can make variations and modifications to this application in terms of the specific implementations and application scopes according to the ideas of this application. Therefore, the content of this specification shall not be construed as a limit to this application.

What is claimed is:

1. A photovoltaic inverter comprising:
an inverter circuit, a data sampling module, and a control module, wherein
the inverter circuit comprises a switch component, the switch component is configured to control on/off of the inverter circuit, a direct current side of the inverter circuit comprises an input bus positive electrode and an input bus negative electrode, the input bus positive electrode and the input bus negative electrode are configured to receive a direct current, an alternating current side of the inverter circuit comprises an alternating current output terminal, and the alternating current output terminal is configured to output an alternating current;
the data sampling module is configured to collect, from the alternating current output terminal, an instantaneous current value at each sampling point moment in target sampling duration and an instantaneous value of each-phase current at a target moment, wherein the target sampling duration is sampling duration that uses the target moment as an end moment; and
the control module is configured to:
determine a valid current value of the target sampling duration based on the instantaneous current value at each sampling point moment, determine an upper switching frequency limit and a lower switching frequency limit of an $N^{th}$ switching period based on the valid current value, and determine a target instantaneous current value $I_N$ based on the instantaneous value of each-phase current at the target moment; and
determine a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period, wherein $F_{ND} \leq f_N \leq F_{NU}$, the target switching frequency is used to control the switch component, and N is an integer greater than 1, wherein
in response to $I_N > I_{N-1}$, and $F_{ND} \leq f_{N-1} \leq F_{NU}$, $f_N > f_{N-1}$; or in response to $I_N < I_{N-1}$, and $F_{ND} \leq f_{N-1} \leq F_{NU}$, $f_N$ is less than $f_{N-1}$, wherein $f_{N-1}$ is a target switching frequency of an $(N-1)^{th}$ switching period, and $I_{N-1}$ is a target instantaneous current value of the $(N-1)^{th}$ switching period.

2. The photovoltaic inverter according to claim 1, wherein the control module comprises a calculation unit; and
the calculation unit is configured to: determine the valid current value of the target sampling duration based on the instantaneous current value at each sampling point moment in the target sampling duration, determine a maximum value of an absolute instantaneous current value based on the instantaneous value of each-phase current at the target moment, and determine the maximum value of the absolute instantaneous current value as the target instantaneous current value $I_N$ of the $N^{th}$ switching period.

3. The photovoltaic inverter according to claim 2, wherein the control module further comprises a frequency control unit; and
the frequency control unit is configured to:
determine, based on the valid current value of the target sampling duration, a first mapping relationship, and a second mapping relationship, an upper switching frequency limit $F_{NU}$ and a lower switching frequency limit $F_{ND}$ that correspond to the valid current value of the target sampling duration, wherein the first mapping relationship is a mapping relationship between an upper switching frequency limit and a valid current value, the second mapping relationship is a mapping relationship between a lower switching frequency limit and a valid current value, the upper switching frequency limit in the first mapping relationship first decreases and then increases as the valid current value increases, and the lower switching frequency limit in the second mapping relationship first decreases and then increases as the valid current value increases; and determine $f_N$ based on $F_{NU}$, $F_{ND}$, and the maximum value of the absolute instantaneous current value.

4. The photovoltaic inverter according to claim 3, wherein the frequency control unit is configured to determine $F_{NU}$ as $f_N$ of the $N^{th}$ switching period in response to an absolute deviation value between the maximum value of the absolute instantaneous current value and $\sqrt{2}$ times the valid current value being less than a first preset value.

5. The photovoltaic inverter according to claim 3, wherein the frequency control unit is configured to determine $F_{ND}$ as $f_N$ of the $N^{th}$ switching period in response to the alternating current output terminal outputting a three-phase alternating current, and in response to an absolute deviation value between the maximum value of the absolute instantaneous current value and $\sqrt{6}/2$ times the valid current value being less than a second preset value.

6. The photovoltaic inverter according to claim 3, wherein the frequency control unit is configured to determine $F_{ND}$ as $f_N$ of the $N^{th}$ switching period in response to the alternating current output terminal outputting a single-phase alternating current, and in response to an absolute deviation value between the maximum value of the absolute instantaneous current value and zero being less than a third preset value.

7. The photovoltaic inverter according to claim 2, wherein the control module further comprises a drive unit; and the drive unit is configured to generate a control signal of the switch component based on the target switching frequency, wherein the control signal is used to control on/off of the switch component.

8. A switching frequency control method, wherein the method is applied to a photovoltaic inverter, and the photovoltaic inverter comprises an inverter circuit; the inverter circuit comprises a switch component, and the switch component is configured to control on/off of the inverter circuit; a direct current side of the inverter circuit comprises an input bus positive electrode and an input bus negative electrode, and the input bus positive electrode and the input bus negative electrode are configured to receive a direct current; an alternating current side of the inverter circuit comprises an alternating current output terminal, and the alternating current output terminal is configured to output an alternating current; and the method comprises:

obtaining, from the alternating current output terminal, an instantaneous current value at each sampling point moment in target sampling duration and an instantaneous value of each-phase current at a target moment, wherein the target sampling duration is sampling duration that uses the target moment as an end moment;

determining a valid current value of the target sampling duration based on the instantaneous current value at each sampling point moment, determining an upper switching frequency limit and a lower switching frequency limit of an $N^{th}$ switching period based on the valid current value, and determining a target instantaneous current value $I_N$ based on the instantaneous value of each-phase current at the target moment; and determining a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period, wherein $F_{ND} \leq f_N \leq F_{NU}$, the target switching frequency is used to control the switch component, and N is an integer greater than 1, wherein in response to $I_N > I_{N-1}$, and $F_{ND} \leq f_{N-1} \leq F_{NU}$, $f_N > f_{N-1}$; or in response to $I_N < I_{N-1}$, and $F_{ND} \leq f_{N-1} \leq F_{NU}$, $f_N$ is less than $f_{N-1}$, wherein $f_{N-1}$ is a target switching frequency of an $(N-1)^{th}$ switching period, and $I_{N-1}$ is a target instantaneous current value of the $(N-1)^{th}$ switching period.

9. The method according to claim 8, wherein the determining the valid current value of the target sampling duration based on the instantaneous current value at each sampling point moment, determining the upper switching frequency limit and the lower switching frequency limit of the $N^{th}$ switching period based on the valid current value, and determining the target instantaneous current value $I_N$ based on the instantaneous value of each-phase current at the target moment comprises:

determining the valid current value of the target sampling duration based on the instantaneous current value at each sampling point moment in the target sampling duration, determining a maximum value of an absolute instantaneous current value based on the instantaneous value of each-phase current at the target moment, and determining the maximum value of the absolute instantaneous current value as the target instantaneous current value $I_N$ of the $N^{th}$ switching period.

10. The method according to claim 9, wherein the determining the target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period comprises:

determining, based on the valid current value of the target sampling duration, a first mapping relationship, and a second mapping relationship, an upper switching frequency limit $F_{NU}$ and a lower switching frequency limit $F_{ND}$ that correspond to the valid current value of the target sampling duration, wherein the first mapping relationship is a mapping relationship between an upper switching frequency limit and a valid current value, the second mapping relationship is a mapping relationship between a lower switching frequency limit and a valid current value, the upper switching frequency limit in the first mapping relationship first decreases and then increases as the valid current value increases, and the lower switching frequency limit in the second mapping relationship first decreases and then increases as the valid current value increases; and determining $f_N$ based on $F_{NU}$, $F_{ND}$, and the maximum value of the absolute instantaneous current value.

11. The method according to claim 10, wherein the determining the $f_N$ based on the upper switching frequency limit $F_{NU}$, $F_{ND}$, and the maximum value of the absolute instantaneous current value comprises:

determining $F_{NU}$ as $f_N$ of the $N^{th}$ switching period in response to an absolute deviation value between the maximum value of the absolute instantaneous current value and $\sqrt{2}$ times the valid current value being less than a first preset value.

12. The method according to claim 10, wherein the determining the $f_N$ based on the upper switching frequency limit $F_{NU}$, $F_{ND}$, and the maximum value of the absolute instantaneous current value comprises:
determining $F_{ND}$ as $f_N$ of the $N^{th}$ switching period in response to the alternating current output terminal outputting a three-phase alternating current, and in response to an absolute deviation value between the maximum value of the absolute instantaneous current value and $\sqrt{6}/2$ times the valid current value being less than a second preset value.

13. The method according to claim 10, wherein the determining the $f_N$ based on the upper switching frequency limit $F_{NU}$, $F_{ND}$, and the maximum value of the absolute instantaneous current value comprises:
determining $F_{ND}$ as $f_N$ of the $N^{th}$ switching period in response to the alternating current output terminal outputting a single-phase alternating current, and in response to an absolute deviation value between the maximum value of the absolute instantaneous current value and zero being less than a third preset value.

14. The method according to claim 9, further comprising generating a control signal of the switch component based on the target switching frequency, wherein the control signal is used to control on/off of the switch component.

15. A photovoltaic inverter comprising:
an inverter circuit, a data sampling module, and a control module, wherein
the inverter circuit comprises a switch component, the switch component is configured to control on/off of the inverter circuit, a direct current side of the inverter circuit comprises an input bus positive electrode and an input bus negative electrode, the input bus positive electrode and the input bus negative electrode are configured to receive a direct current, an alternating current side of the inverter circuit comprises an alternating current output terminal, and the alternating current output terminal is configured to output an alternating current;
the data sampling module is configured to collect, from the alternating current output terminal, an instantaneous current value at each sampling point moment in target sampling duration and an instantaneous value of each-phase current at a target moment, wherein the target sampling duration is sampling duration that uses the target moment as an end moment; and
the control module is configured to:
determine a valid current value of the target sampling duration based on the instantaneous current value at each sampling point moment, determine an upper switching frequency limit and a lower switching frequency limit of an $N^{th}$ switching period based on the valid current value, and determine a target instantaneous current value $I_N$ based on the instantaneous value of each-phase current at the target moment; and
determine a target switching frequency $f_N$ of the switch component in the $N^{th}$ switching period based on the target instantaneous current value $I_N$ and the upper switching frequency limit $F_{NU}$ and the lower switching frequency limit $F_{ND}$ of the $N^{th}$ switching period, wherein $F_{ND} \leq f_N \leq F_{NU}$, the target switching frequency is used to control the switch component, and N is an integer greater than 1.

16. The photovoltaic inverter according to claim 15, wherein in response to $I_N > I_{N-1}$, and $F_{ND} \leq f_{N-1} \leq F_{NU}$, $f_N > f_{N-1}$; or in response to $I_N < I_{N-1}$, and $F_{ND} \leq f_{N-1} \leq F_{NU}$, $f_N$ is less than $f_{N-1}$, wherein $f_{N-1}$ is a target switching frequency of an $(N-1)^{th}$ switching period, and $I_{N-1}$ is a target instantaneous current value of the $(N-1)^{th}$ switching period.

17. The photovoltaic inverter according to claim 16, wherein the control module comprises a calculation unit; and
the calculation unit is configured to: determine the valid current value of the target sampling duration based on the instantaneous current value at each sampling point moment in the target sampling duration, determine a maximum value of an absolute instantaneous current value based on the instantaneous value of each-phase current at the target moment, and determine the maximum value of the absolute instantaneous current value as the target instantaneous current value $I_N$ of the $N^{th}$ switching period.

18. The photovoltaic inverter according to claim 17, wherein the control module further comprises a frequency control unit; and
the frequency control unit is configured to:
determine, based on the valid current value of the target sampling duration, a first mapping relationship, and a second mapping relationship, an upper switching frequency limit $F_{NU}$ and a lower switching frequency limit $F_{ND}$ that correspond to the valid current value of the target sampling duration, wherein the first mapping relationship is a mapping relationship between an upper switching frequency limit and a valid current value, the second mapping relationship is a mapping relationship between a lower switching frequency limit and a valid current value, the upper switching frequency limit in the first mapping relationship first decreases and then increases as the valid current value increases, and the lower switching frequency limit in the second mapping relationship first decreases and then increases as the valid current value increases; and
determine $f_N$ based on $F_{NU}$, $F_{ND}$, and the maximum value of the absolute instantaneous current value.

19. The photovoltaic inverter according to claim 16, wherein the control module further comprises a drive unit; and
the drive unit is configured to generate a control signal of the switch component based on the target switching frequency, wherein the control signal is used to control on/off of the switch component.

20. The photovoltaic inverter according to claim 16, wherein
the frequency control unit is configured to determine $F_{NU}$ as $f_N$ of the $N^{th}$ switching period in response to an absolute deviation value between the maximum value of the absolute instantaneous current value and $\sqrt{2}$ times the valid current value being less than a first preset value.

* * * * *